UNITED STATES PATENT OFFICE.

ALADAR PACZ, OF CLEVELAND, OHIO, ASSIGNOR TO GENERAL ELECTRIC COMPANY, A CORPORATION OF NEW YORK.

METAL AND ITS MANUFACTURE.

1,299,017.      Specification of Letters Patent.      Patented Apr. 1, 1919.

No Drawing.      Application filed May 25, 1914. Serial No. 840,721.

*To all whom it may concern:*

Be it known that I, ALADAR PACZ, a citizen of the United States, residing at Cleveland, in the county of Cuyahoga, State of Ohio, have invented certain new and useful Improvements in Metals and Their Manufacture, of which the following is a specification.

My invention relates to metals in general and to the processes of their manufacture. The object of my invention, stated generally, is to improve the said processes of manufacture so as to produce metals having properties which will render them more durable and, in this and other respects, more suitable for use in the arts.

In its more specific aspect, my invention is applicable to metals which are produced by mechanically working an agglomeration of finely divided metals. An example of such a metal is tungsten, which is produced in a wrought and drawn state by the process described in Coolidge Patent No. 1,082,933, issued December 30, 1913.

One of the main difficulties which is met with in the case of metals in general is that, when subjected to the severe stresses incident to their use in the arts, they lose to a large extent the characteristics which they originally possessed. This is particularly true of metals which are subjected to heating at a high temperature, as by heating to incandescence. Under such conditions, as a rule, metal bodies lose their pliability and, moreover, tend to lose their original form or shapes. Another difficulty is that high heating or other stress causes the metal to crack. In the case of wrought or drawn tungsten which is made into filaments for incandescent lamps, this failure to retain its original properties is quite striking. Although the said metal is pliable and will take a set as originally made, after its use in the incandescent lamp it becomes quite brittle and sags, losing its original shape. Moreover, unless means are taken to lessen the tendency to crack, cracking will occur and produce the condition known as offsetting. Offsetting is a lateral shifting of one section of filament with respect to the adjacent section. There are methods in use for preventing offsetting. These are described in the aforesaid Coolidge patent, and also in Frech Patent No. 1,089,757, March 10, 1914. In a general way these methods are similar in that they consist in incorporating with the tungsten or rather the oxid from which the tungsten is derived, certain foreign materials such as those obtained by firing the tungstic oxid in a Battersea or Hessian crucible, or by firing it with a compound of thorium. Although these methods have proven efficacious, they have the disadvantage that the introduction of foreign material of this kind into the filament is apt to have deleterious effects. Although at present these deleterious effects can not be definitely stated, it is obvious that the fewer the materials entering into the composition of the filament the more easily can uniformity in the final product be secured. The advantage of uniformity in a product of such great output as the incandescent lamp will be obvious. The necessity of rapid manufacture renders desirable a minimum of steps and, therefore, of materials added in the manufacturing process.

The object of my invention is to produce a metal which will possess in a much higher degree than any metal of the same name heretofore produced, the characteristic of retaining its original properties when subjected to severe physical stresses. I attain this object without adulterating the metal. My invention as hereinbefore stated, is particularly applicable to metals produced by agglomerating finely divided metal and then working it into wrought or drawn form. The metal produced by the process described in the Coolidge patent heretofore referred to, and at present used in the manufacture of filaments for incandescent lamps, runs 99.2% or below pure metal. On the other hand, the metal comprised by my invention runs above 99.2% pure metal. I have produced metals having the desirable properties hereinbefore described which ran from 99.7% to 99.95% pure tungsten. These metals were pliable and showed no offsetting after continued use as filaments in incandescent lamps. Moreover, coiled filaments made from these metals retained their shape to a very high degree after continued use.

The novel portion of the process comprised by my invention is applied to the production of the original metal and prior to any working of the same. In the case of metals produced from an agglomeration of fine metals, it is applied to the production of the constituent fine metals and their agglomeration. In the case of tungsten and similar metals the remainder of the process, namely, the working of the metal, is similar to the corresponding portion of the process described in the Coolidge patent hereinbefore referred to. I have discovered that, instead of forming the slug by agglomerating a simple, finely divided metal, greatly superior results are secured by forming the same of two or more metals having substantially the same chemical composition but differing in certain respects in physical characteristics. It is not sufficient that the differences in the physical characteristics of the constituent metals reside in the shape or size of the discrete particles thereof. My theory is that these differences in the metals have their origin in differences in the molecular structure. Although disclaiming any intention to limit myself to any particular theory, I will use the term "molecular" to define the differences which I consider must be present in order to secure the desired results, and by this term I mean such differences as are ulterior to those of mere shape or size of particles.

Various methods may be adopted to secure the desired differences in the molecular structure of these finely divided metals. The method to which I attach the greatest importance is the variation of the base of the compound from which the metal is ultimately derived. Another method is to form by polymerization various compounds having the same base and to derive the metal from each. This may be done by the addition of chemical compounds in certain ways or by heating or by the combination of these methods. Perhaps the best results are secured by the combination of all of these methods. However, the same general principle applies to all of them and it is obvious that the desired effect may be secured by one of them alone if applied to the proper degree.

As a demonstration of the efficacy of the first of the methods above referred to, I have obtained several varieties of finely divided tungsten by varying the base of the compound from which the tungsten was derived. By treating commercial tungstic oxid with compounds of lithium, ammonium, sodium, and potassium, respectively, and deriving the finely divided tungsten from the compound of tungsten formed in this way in each case, I found that the samples differed considerably in physical characteristics. For instance, the order of blackness of the metal was the same as that of the atomic weight of the base. In other words, the higher the atomic weight of the base, the blacker the finely divided metal. This was also true of the order of density. On the other hand, the order of electrical conductivity was inverse to that of the atomic weight. It is probable that the metals thus produced are allotropic forms of tungsten. However, I do not wish to be limited by the accepted meaning of this term. The fact is that the ultimate metals had practically the same chemical composition but had the above stated differences in physical characteristics. As uniformity was preserved in the derivation of the metals, except as to the base of the compounds from which the metals were derived, it is logical to attribute the aforesaid differences to the use of different bases. Owing to the fact that the above stated differences are not such as depend merely upon the size or shape of the particles, I consider that they reside in the molecular structure of the metal, using the term "molecular" in the sense hereinbefore defined.

I will now give a specific example of my invention as applied to the production of tungsten. A mixture is made of tungstic oxid 1400 grams, potassium carbonate 620 grams, sodium carbonate 620 grams, sodium nitrate 150 grams, and potassium nitrate 150 grams. These ingredients are mixed with a sufficient amount of water to make a thick paste. This paste is then poured upon a sheet iron plate and heated to a temperature of about 500 degrees to 600 degrees C. and allowed to dry to form a cake. The action of the heat upon this cake softens it somewhat and it is worked with an iron spatula for half an hour or more until the green color which it has at first disappears. The material is then heaped in a pile on an iron plate and heated at about 900 degrees C. by a gas flame played directly upon it. This is continued for about fifteen minutes. During this operation the mass shrinks in volume and a part of the carbon dioxid is driven off. After this, the material is dissolved in about six liters of water and the solution filtered. Tungstic oxid is then precipitated by means of hydrochloric acid. The tungstic oxid so obtained is then dissolved in aqueous ammonia, one cubic centimeter of ordinary concentrated ammonia being used to one gram of tungstic oxid, and such amount of water being added that the resulting solution will contain 300 grams of tungstic oxid per liter. The solution is then divided into two parts. From one part ammonium tungstate crystals are formed, either by adding concentrated hydrochloric acid to the point of neutralization or by playing a gas flame directly upon the solution. I prefer the latter method. The crystals so obtained are then dried and ignited at a temperature of about 450 degrees C. to produce tungstic oxid. From the other part of the solution tungstic oxid is reprecipitated by means of hydrochloric acid. The tungstic oxids thus obtained are mixed and reduced to tungsten powder which may be worked into wire in the manner disclosed in the Coolidge patent hereinbefore referred to.

Although the tungstic oxids produced from each half of the solution, as above described, are of the same chemical formula, their physical characteristics are different. I consider that the tungstic oxid obtained from the crystals of ammonium tungstate has characteristics corresponding to potassium, while the tungstic oxid obtained from the other half of the solution has characteristics corresponding to ammonium. According to my theory, the potassium being more electropositive than the sodium, gives the character to the tungstic oxid in the first fusion. The tungstic oxid precipitated by means of hydrochloric acid still retains this influence, as subsequent dissolving in ammonia and crystallization do not destroy it. However, in the case of the other half of the solution the reprecipitation of the tungstic oxid by means of hydrochloric acid destroys the potassium characteristic and gives the tungstic oxid thus produced the ammonium characteristic. For convenience in designating these varieties of tungstic oxids, I apply to them the numeral corresponding to the atomic weight of the element or radical whose characteristic they possess. Consequently, the lithium tungstic acid would be known as 7, the ammonium as 18, the sodium as 23, the potassium as 39, and so on. In the specific process above described the tungstic oxid derived from the crystals would be known as 39 tungstic oxid, while that derived by reprecipitation would be known as 18 tungstic oxid. Although good results may be obtained by mixing various kinds of these tungstic oxids, I have obtained the best results by including in each mixture with one or more of the other kinds at least a small portion of the 39 tungstic oxid.

In connection with the reprecipitation by means of hydrochloric acid of the tungstic oxid from one portion of the ammonium tungstate solution I have found that exceptionally good results are secured in the following manner: The hydrochloric acid is added gradually until neutralization of the solution is secured. At this point various ammonium tungstate and probably metatungstate and poly-tungstate crystals are formed. The whole solution and crystals contained therein is then poured into hot hydrochloric acid and the tungstic oxid is thrown down. The good results thus obtained I attribute to the fact that the tungstic oxids obtained from the polymers of ammonium tungstate have different molecular structure and properties. It is to be noted also that the original fusion of the material with the nitrate present would have the effect of producing polymers to a certain extent.

I have found that to obtain the best results care should be taken to conduct the heating of the mixed tungstic oxids under proper conditions. The amount of the material and the thickness of the layer which is being heated, the temperature of heat, the pressure applied to the materials, the fineness of the material and the duration of heating all seem to affect the result.

In mixing and reducing the oxids, in one case which gave very good results, I adopted the following procedure. I made up six batches of tungstic oxid, the first batch being 140 grams 39 and 10 grams 18; the second 130 grams 39 and 20 grams 18; the third 120 grams 39 and 30 grams 18; the fourth 110 grams 39 and 40 grams 18; the fifth 100 grams 39 and 50 grams 18; and the sixth 90 grams 39 and 60 grams 18. In each case the materials were mixed thoroughly, put in boats and compressed by the application of about 700 pounds. Each was then shoved through an electric tube furnace, about two feet long, at a uniform rate, so that it took about ten minutes for each of them to pass through the furnace. The temperature maintained was between 900 and 1100 degrees C. The resulting material was then powdered up and all of the batches mixed, after which the tungstic oxid was reduced, by means of hydrogen, to tungsten powder, the heat being about 900 degrees C. An analysis of the metal thus produced showed that it ran about 99.9% tungsten. Filaments produced from this metal were much superior to those heretofore produced. Not only was offsetting practically eliminated, but the wire was much more pliable after continued burning. One test applied which demonstrated the superiority of the metal as to pliability was to run it at an efficiency of .8 watts per candlepower for a period of 120 hours. Under the same conditions the filaments heretofore produced become brittle. The metal produced by my process was still quite pliable and possessed considerable tensile strength. When subjected to a test in which a knife edge was pressed against the filament so as to crimp it at a number of uniformly spaced points, the filament produced by my process showed 100 per cent. pliability, while the other metal was broken up into small pieces. My wire also showed no tendency to offset. I have found that a test which may be applied to wire which will show whether it will offset in the lamp is to give it what is known as the cross-section test. For this test a rod of a metal of 80 mils in diameter is heated for 8 minutes in hydrogen at a temperature close to the melting point of tungsten. The rod is then fractured and the cross-section examined. If the cross-section is shiny or shows coarse grains, the filament will offset. On the other hand, if the structure is finely granular, the filament will not offset. Rods produced from the metal, as above described, when subjected to this test had cross-sections which were finely granular.

It is to be understood that other methods of obtaining the requisite variety of the molecular and physical characteristics of the constituent metals will readily suggest themselves to those skilled in the art. Although I have given a specific example of my method as applied to tungsten, it is obvious that in case of other metals variations may be made to suit the particular metal which is to be produced. All of such variations are to be considered as coming within the scope of my invention.

What I claim as new and desire to secure by Letters Patent of the United States, is:—

1. An agglomeration for use in the manufacture of tungsten bodies consisting of a mixture of substantially pure tungstens derived from different chemical compounds of tungsten.

2. An agglomeration for use in the manufacture of tungsten filaments for incandescent lamps consisting of a mixture of substantially pure tungstens derived from different chemical compounds of tungsten.

3. The process of producing tungsten and like metal bodies having the property of retaining to a high degree their original characteristics when subjected to severe physical stresses which consists in agglomerating metals of substantially the same chemical composition but differing in molecular physical characteristics and then mechanically working the bodies so formed.

4. The step in the production of tungsten and like metal bodies having the property of retaining to a high degree their original characteristics when subjected to severe physical stresses which consists in mixing together metals having substantially the same chemical composition but differing in their mode of preparation so that they have different molecular structures.

5. The step in the process of producing tungsten and like metal bodies having the property of retaining to a high degree their original characteristics when subjected to severe physical stresses which consists in mixing together metals having substantially the same chemical composition but differing in respect to the chemical compounds from which they are derived.

6. The process of producing tungsten and like metal bodies for use as filaments in incandescent lamps having the property of retaining to a high degee their original characteristics when subjected to severe physical stresses which consists in agglomerating finely divided metals of substantially the same chemical composition but differing in their molecular physical characteristics and then mechanically working the body so formed.

7. The step in the production of tungsten and like metal bodies for use as filaments in incandescent lamps having the property of retaining to a high degree their original characteristics when subjected to severe physical stresses which consists in mixing together metals having substantially the same chemical composition but differing in their mode of preparation so that they have different molecular structure.

8. The step in the process of producing tungsten and like metal bodies for use as filaments in incandescent lamps having the property of retaining to a high degree their original characteristics when subjected to severe physical stresses which consists in mixing together metals having substantially the same chemical composition but differing in respect to the chemical compounds from which they are derived.

9. The step in the process of producing tungsten which consists in mixing together tungsten powders of substantially the same purity but derived from different chemical compounds of tungsten.

10. The step in the process of producing tungsten which consists in mixing together tungsten powders of substantially the same purity but derived from chemical compounds of tungsten having different bases.

11. The process of producing tungsten which consists in mixing together tungsten powders of substantially the same purity but derived from different chemical compounds of tungsten, agglomerating the mixture and mechanically working the body so produced.

12. The process of producing tungsten which consists in mixing together tungsten powders of substantially the same purity but derived from chemical compounds of tungsten having different bases, agglomerating the mixture and mechanically working the body so produced.

13. A tungsten body substantially free from offsetting after continued subjection to temperatures attained by filaments in electric incandescent lamps and containing substantially no non-metallic material or other metal.

14. A tungsten filament substantially free from offsetting after continued use in an electric incandescent lamp and containing substantially no non-metallic material or other metal.

15. A drawn tungsten body substantially free from offsetting after continued subjection to temperatures attained by filaments in electric incandescent lamps and containing substantially no non-metallic material or other metal.

16. A drawn tungsten filament substantially free from offsetting after continued use in an electric incandescent lamp and containing substantially no non-metallic material or other metal.

17. An electric incandescent lamp composed of tungsten containing substantially no non-metallic material or other metal, and capable of continued use without becoming substantially brittle.

In witness whereof, I have hereunto set my hand this 21st day of May, 1914.

ALADAR PACZ.

Witnesses:
  PAUL P. BACHMANN,
  JOHN H. ANDERSON.